(12) United States Patent
Van Houten et al.

(10) Patent No.: US 6,682,151 B1
(45) Date of Patent: Jan. 27, 2004

(54) WHEEL COVER RETENTION APPARATUS

(75) Inventors: Garry Van Houten, Middleville, MI (US); Lawrence E. O'Toole, Highland, MI (US)

(73) Assignee: Lacks Industries, Inc., Grand Rapids, MI (US)

(*) Notice: Subject to any disclaimer, the term of this patent is extended or adjusted under 35 U.S.C. 154(b) by 0 days.

(21) Appl. No.: 10/253,749

(22) Filed: Sep. 24, 2002

(51) Int. Cl.$^7$ .............................. B60B 7/14; B60B 7/10
(52) U.S. Cl. .......................... 301/37.373; 301/37.372; 301/37.34
(58) Field of Search ...................... 301/37.101, 37.102, 301/37.32, 37.33, 37.34, 37.372, 37.373, 37.375, 37.376

(56) References Cited

U.S. PATENT DOCUMENTS

| | | | | |
|---|---|---|---|---|
| 4,133,583 A | * | 1/1979 | Spisak ..................... | 301/37.34 |
| 4,382,635 A | * | 5/1983 | Brown et al. ............ | 301/37.35 |
| 5,071,197 A | * | 12/1991 | Webster et al. ......... | 301/37.372 |
| 5,249,845 A | * | 10/1993 | Dubost .................. | 301/37.373 |
| 5,297,854 A | * | 3/1994 | Nielsen et al. ......... | 301/37.373 |
| 5,595,422 A | * | 1/1997 | Ladouceur ............... | 301/37.21 |
| 5,918,946 A | * | 7/1999 | DiMarco ............... | 301/37.375 |
| 6,238,007 B1 | * | 5/2001 | Wieczorek et al. ...... | 301/37.31 |

* cited by examiner

Primary Examiner—S. Joseph Morano
Assistant Examiner—Jason R. Bellinger
(74) Attorney, Agent, or Firm—VanOphem & VanOphem, P.C.

(57) ABSTRACT

An ornamental wheel cover integrally retained on the lug nuts of a vehicle wheel that provides positive positioning of the cover to the lug nuts. The cover is provided with a number of elongated tubular extensions axially projecting therefrom that are each partially slotted to provide a plurality of cantilevered fingers. Each finger has an undercut groove that positively positions the cover to the lug nuts of the wheel. When the cover is attached to the wheel, the elongated tubular extensions are aligned with the lug nuts and the cover is moved axially inwardly of the wheel so that the cantilevered fingers separate slightly as they pass over the flange of the lug nut. The wheel cover further includes a wire band retainer to bias the innermost cantilevered fingers into continual engagement with the lug nuts, even during temperatures that would otherwise cause the plastic to distort due to heat creep.

18 Claims, 4 Drawing Sheets

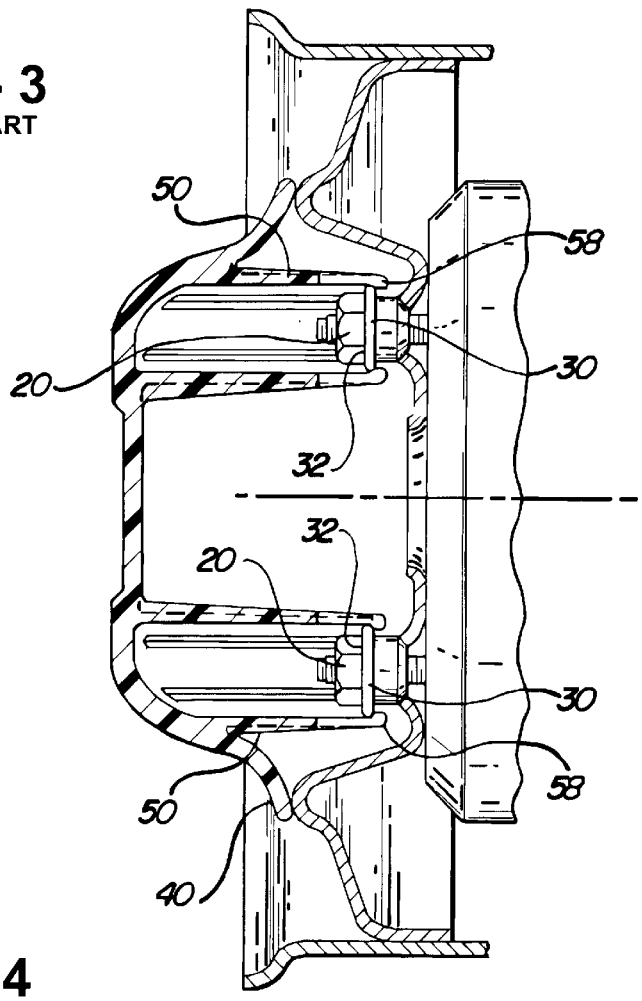
FIG - 3
PRIOR ART
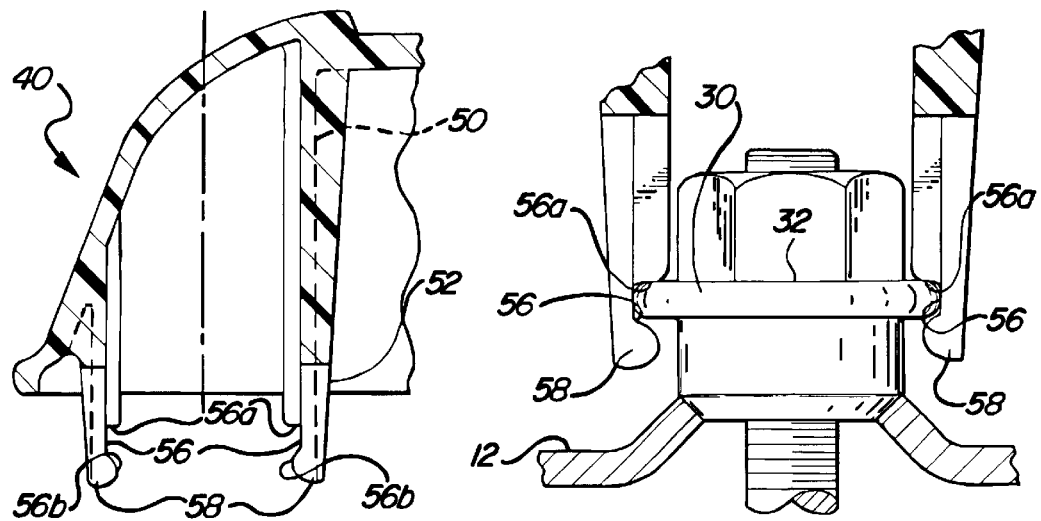
FIG - 4
PRIOR ART
FIG - 5
PRIOR ART

WHEEL COVER RETENTION APPARATUS

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to plastic wheel covers with integral retention systems. More specifically, this invention is directed to an ornamental wheel cover that is easily attachable and removable, that is inexpensive, and that has a wire retention device to provide improved wheel cover retention.

2. Description of the Related Art

Related art references have suggested various methods and apparatuses for removably attaching a wheel cover to a wheel. For example, U.S. Pat. No. 4,123,111 to Renz et al. discloses a retaining cover that is provided circumferentially in the engaging plane of the lug nuts with detents to engage the outer periphery of the lug nuts. The retaining cover has a shape that differs from the circular shape of the wheel cover exhibiting a relatively large lever arm between the connecting lines of the points of engagement of the lug nuts, thereby reducing the spring rate. The lug nuts are seated in recesses in the peripheral edge of the retaining cover. The edge of the retaining cover snaps in within the area of the recesses. To cover the lug nuts a wheel cover cap is provided that is mounted over the retaining cover.

Several problems exist with the Renz et al. device. Plastic is a relatively low strength material which tends to relax and/or creep over time and with temperature. Therefore, removal and replacement of the retaining cover could lead to loss of retention of the retaining cover to the lug nuts. The retaining cover is subject to stress and flexing in an area that is recessed and has a much thinner material thickness than the surrounding area of the cover, thereby making it subject to cracking. Thermal expansion rates between the steel lug nut and plastic cover differ aggravating the above stated problems. Further, the fact that Renz et al. require a relatively large lever arm between the connecting points of engagement and the detent points in order to reduce the spring rate, it would not be possible to obtain this arrangement with shallow profile wheel covers. Further, the two-piece assembly provides large cavities between the retaining cover and the outer wheel cover in which mud and road debris can collect over time.

U.S. Pat. No. 4,382,635 to Brown attempts to overcome some of these problems by disclosing a wheel cover with integral retention fingers which is useable on conventional steel wheels. The cover is integrally retained on the wheel by the cooperating inter-engagement of tubular extensions of the cover mounting to the lug nuts. The extensions are axially slotted so as to be divided into a plurality of cantilevered fingers which cooperate with the lug nuts to retain the wheel cover thereto. The fingers of each extension include integral radially extending abutments which resiliently engage within a radial opening groove of a respective lug nut to resiliently grip the nut and retain the cover thereto. Concurrent with receipt of the abutments in the groove, a tapered radial face on each finger engages an axially outwardly extending annular face of the apertured embossment in an attempt to provide a slight axial outward force on each finger to prevent axial shifting movement of the extensions relative to the lug nuts.

The abutments describe a circle which is slightly less than the circle of the hexagonal portion of the lug nuts so that the fingers slightly separate or flex axially outwardly as the abutments move over the hexagonal portion of the lug nuts. Therefore, the fingers separate as the abutments move over an annular rib of the lug nuts until the abutments snap into the circumferential groove in each respective lug nut. When the abutments are received in the groove, the fingers return substantially to their normal position. A radial tapered face of each abutment engages an axially outwardly extending annular face of the wheel surface to provide a slight axial outward force on each extension to prevent axial shifting movement of the extensions relative to the lug nuts.

One of several problems associated with this design is the adverse effects of tolerance stack ups between the axially outwardly extending annular face and the location of the groove on the lug nut. The fit of the cover to the lug nut depends on the depth and width of a groove that is on the lug nut and a tapered surface on the wheel face next to where the lug nut is seated. The tolerance build up among the radial tapered extension on the end of each finger of the cover, the lug nut, and the taper on the wheel's surface results in groove width variations that will prevent the radial tapered face of the abutment to move to the bottom of the groove, resulting in a loose fit on the lug nut and a stress condition in the fingers of the retainer, thereby subjecting the retainer to the previously described problems regarding the use of plastic.

Another problem associated with the lack of positive positioning in the Brown design is the potential for improper installation. It is possible, during attachment of the cover to the wheel, to apply a force that causes the cover to overtravel and press the fingers against the tapered wheel surface which in turn opens up the fingers, forcing them out of the groove and causing them to travel along the tapered wheel surface, which results in a loose fit.

Yet another drawback of the Brown design is a potential problem with the location of the circumferential groove on the lug nut and improper torque on aluminum wheels. It is known in the art that in order to achieve proper torque on the lug nuts for aluminum wheels, the conical seat must be deeper, providing more surface area contact with the wheel surface than required for steel wheels. The groove in the lug nut of the Brown design will prevent the lug nut from seating properly on an aluminum wheel by presenting less surface area contact with the aluminum wheel and thereby making it a problem to achieve sufficient torque for an aluminum wheel. In other words, the lug nut in the Brown design is not compatible with both steel and aluminum wheels.

As a solution to some of the above disadvantages, U.S. Pat. No. 5,163,739 to Stanlake teaches a wheel cover that includes a plurality of integral tubular extensions for attaching the wheel cover to the lug nuts of the wheel. Each tubular extension has a plurality of slots extending axially from the wheel cover wherein the slots define a plurality of fingers that axially engage an annular rib of a respective lug nut. The fingers include an undercut portion to accommodate a one-piece wire band retainer having a plurality of circumferentially expanding rings and a plurality of concave bends. Alternatively, a split ring wire retainer may also be used.

The wire band retainer is pushed onto the integral tubular extensions such that the fingers flex radially inward and the circumference of the rings increase to encircle the fingers of the extensions and be received by the undercuts. The increase in the circumference of the rings is facilitated by the concave bends of the retainer flexing to a straightened position. Accordingly, Stanlake teaches a retention apparatus whereby the tubular extensions of the wheel cover are completely encircled by the wire band retainer to limit the outward radial movement of the flexible fingers and to bias the flexible fingers into engagement with the lug nuts.

While the incorporation of the wire retainer addresses some of the problems associated with conventional plastic wheel covers, there are several difficulties with the Stanlake invention. The wheel cover taught by Stanlake can only be removed from the wheel by first removing the lug nuts which is a difficult and time consuming process as compared with conventional snap-fit plastic wheel covers. Furthermore, the wheel cover is limited to wheel applications in which it is desirable to have exposed lug nuts as access thereto is essential. Finally, the configuration taught by Stanlake in which a one-piece wire band retainer encircles the perimeter formed collectively by the lug nuts, encircles each lug nut individually, and provides for a plurality of concave bends requires excessive wire material thereby incurring unnecessary material cost.

Because of the various problems identified with prior art retention systems, there is a need for a wheel cover having an integral fastening system that provides positive positioning of the cover relative to the wheel thereby eliminating the effects of tolerance stack ups and the possibility of overtravel that result in poor fit of the cover to the wheel. There is also a need for a decorative wheel cover that is capable of covering the central portion of a wheel including the lug nuts, that is easily attachable and removable, that maintains retention in high temperature environments, and that maintains retention after repeated attachment and removal. The cover attachment must not affect the lug nut torque or the contact interface between the lug nut and the wheel surface area so that a standard lug nut can be used for both aluminum and steel wheels.

BRIEF SUMMARY OF THE INVENTION

According to the preferred embodiment of the present invention, there is provided an ornamental wheel cover assembly integrally retained on the lug nuts of a vehicle wheel. The lug nuts preferably have a flange that defines an upper shoulder. The wheel cover assembly includes a wheel cover and a wire band retainer. The wheel cover includes a front face having visible decorative features and a rear face. The rear face of the wheel cover has a plurality of elongated tubular extensions axially projecting therefrom, and a plurality of support features disposed between the elongated tubular extensions.

The elongated tubular extensions are slotted to provide a plurality of cantilevered fingers. Each cantilevered finger terminates with a bulbous portion to provide snap fit engagement of the wheel cover assembly to the lug nuts whereby the wheel cover is easily attachable and removable. The cantilevered fingers further include an undercut groove adapted to engage the upper shoulder of the lug nut flange and thereby positively position the wheel cover assembly to the lug nuts.

The wire band retainer is generally circular and has a plurality of concave sections. The plurality of support features locate and retain the wire band retainer within the wheel cover, on the inner diameter of the circle having a perimeter defined by the tubular extensions collectively. The plurality of concave sections are designed to support a portion of the tubular extensions to bias and maintain the corresponding cantilevered tapered fingers into engagement with the lug nuts.

When the wheel cover assembly is attached to the wheel, the elongated tubular extensions are aligned with the lug nuts and the cover is moved axially inwardly of the wheel so that the cantilevered fingers separate slightly as they pass over the flange of the lug nut. Additionally, as the wheel cover is attached to the wheel, the flexible fingers in contact with the wire band retainer act to deform the wire band in a direction toward the center of the wheel cover while the bulbous portion of the finger pass over the flange of the lug nuts, and thereafter the wire band retainer biases the innermost fingers into engagement with a respective lug nut.

As is well known in the art, metal is generally less prone to relaxation and/or creep over time and with temperature as compared to plastic. The wheel cover assembly described herein incorporates the metallic wire band retainer to improve resistance to creep, relaxation and high temperature effects. Furthermore, the bulbous portion of each finger is configured such that the wheel cover is snap-fit attachable and similarly removable. As the wire band retainer of the present invention does not encircle the cantilevered fingers, the wheel cover can quickly and easily be removed from the wheel without removing each lug nut.

It is an object of the present invention to provide a decorative wheel cover assembly for covering the lug nuts and the central portion of the wheel.

It is another object that such a wheel cover assembly is adapted to incorporate a snap-fit engagement device such that the wheel cover is both easily attachable and removable.

It is still another object that such a wheel cover assembly is configured to maintain engagement with a wheel when subjected to a high temperature environment.

It is yet another object to provide a wheel cover that is subject to creep or thermally excessive environments where a retainer is used that maintains some of the fingers biased to prevent the cover from separating from the lug nuts.

It is a further object to provide a wheel cover that is capable of maintaining engagement with a wheel after being repeatedly attached to and removed from a wheel.

It is still a further object to provide a wheel cover that is inexpensive to manufacture and assemble.

These objects and other features, aspects, and advantages of this invention will be more apparent after a reading of the following detailed description, appended claims, and accompanying drawings.

BRIEF DESCRIPTION OF THE SEVERAL VIEWS OF THE DRAWINGS

FIG. 3 is a sectional view of FIG. 2 including the prior art wheel cover of FIG. 1;

FIG. 4 is a sectional view of an elongated tubular extension of the prior art wheel cover of FIG. 1, prior to attachment to one of the lug nuts of FIG. 2;

FIG. 5 is an enlarged sectional view of the prior art elongated tubular extension of FIG. 4 shown attached to one of the lug nuts of FIG. 2;

DETAILED DESCRIPTION OF THE PREFERRED EMBODIMENT

Generally shown in the Figures, an ornamental wheel cover assembly integrally retained on the lug nuts of a wheel is shown in accordance with the present invention. In the context of the following detailed description of the preferred embodiment, references to the terms inboard, outboard, front, rear, radial and axial apply to a vehicle component as viewed in the final assembled position unless otherwise specified.

Figure 6:
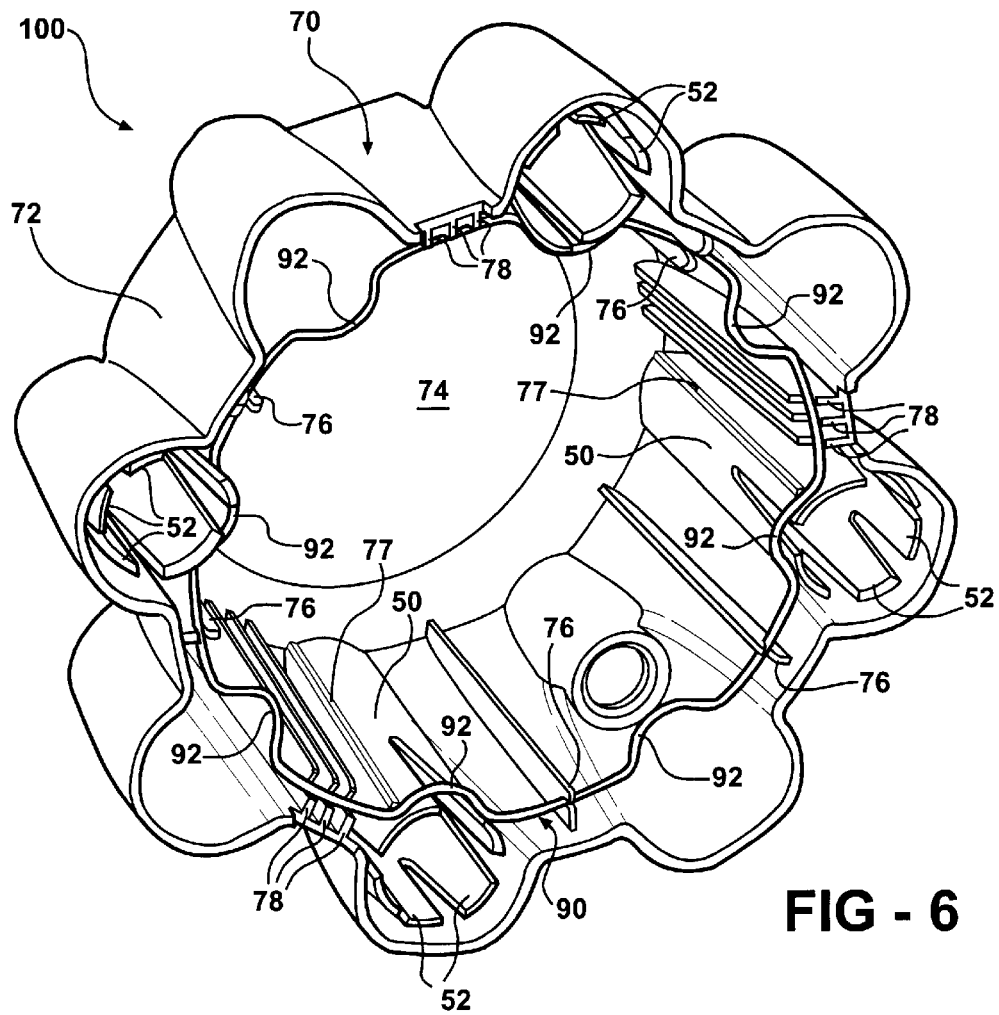
FIG. 6 is a perspective of the wheel cover assembly according to the present invention.

Referring now in detail to the Figures, there is shown in FIG. 6 a wheel cover assembly 100 that is constructed in accordance with a method of the present invention. The wheel cover assembly 100 generally includes a wheel cover 70, and a wire band retainer 90 attached thereto. The wheel cover 70 includes some of the features of a wheel cover 40 described in detail in Hauler et al., U.S. Pat. No. 6,022,081 owned by the assignee hereof and that is incorporated herein by reference in its entirety. For the purpose of clearly understanding the current invention, some limited description of the wheel cover 40 is provided. Furthermore, common features are designated with the reference characters as provided in the Hauler et al. patent wherever possible to maintain continuity.

Figure 1:
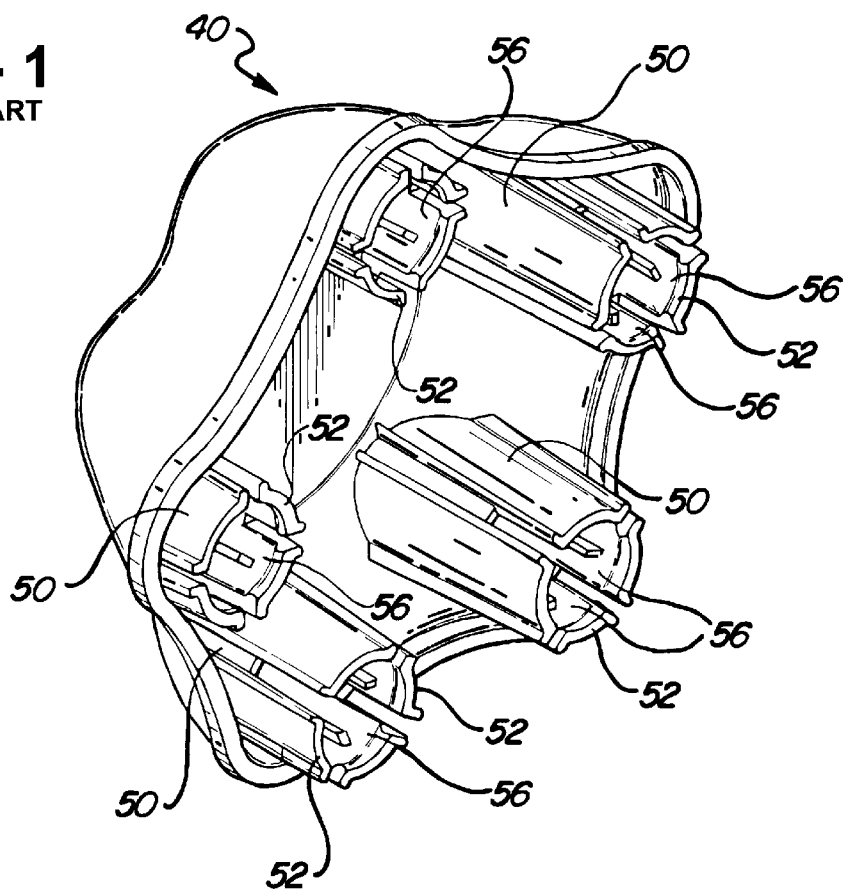
FIG. 1 is a respective view of the rear of a prior art wheel cover.
Figure 2:
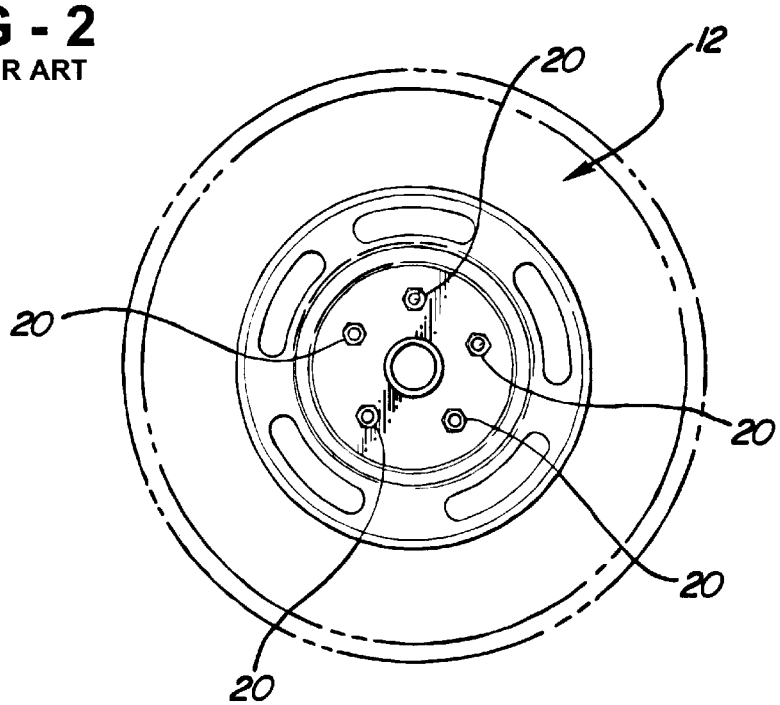
FIG. 2 is a plan view of a prior art wheel and lug nuts to which the prior art wheel cover (not shown) is to be attached.

As best seen in FIGS. 1–3, the wheel cover 40 is integrally retained on lug nuts 20 of a vehicle wheel 12 that provides positive positioning in an inboard/outboard axial direction of the cover 40 to the lug nuts 20. The lug nuts 20 typically have a flange 30 that defines an upper shoulder 32. In the preferred embodiment of the present invention, the cover 40 is provided with a number of elongated standoffs or tubular partially slotted extensions 50 axially projecting from the back of the cover 40. The extensions 50 are each partially slotted to provide a plurality of cantilevered fingers 52. The cantilevered fingers 52 are preferably tapered such that the thickness of each cantilevered finger 52 decreases as the finger 52 extends axially from the wheel cover 40.

Referring now to FIG. 4, it can be seen that near the end of each cantilevered tapered finger 52 is an undercut groove 56 with a shoulder 56a that defines one end of the groove 56 and a tapered portion 56b defining an opposite end of the groove 56. Each cantilevered tapered finger 52, beyond the groove 56, terminates in a bulbous portion 58. When the cover 40 is attached to the wheel 12, the elongated tubular extensions 50 are aligned with the lug nuts 20 and the cover 40 is moved axially inwardly of the wheel 12 so that the cantilevered fingers 52 separate slightly as their bulbous end portions 58 pass over the lug nut 20 and associated flange 30 until the undercut groove 56 is allowed to snap over the flange 30 of the lug nut 20. Concurrently, the shoulder 56a of the undercut 56 will abut against the upper shoulder 32 of the lug nut flange 30, thereby providing a positive axial location of the cover 40 to the wheel 12 and eliminating the effects of tolerance stack ups of any other surfaces.

As best seen in FIG. 5, the bulbous portion 58 passes over the flange 30 of the lug nut 20 and the tapered portion 56b engages the underside of the flange 30, thereby creating a retention force sufficient to retain the cover 40 on the lug nut 20. The end of the elongated tubular extension 50 is spaced a predetermined distance from the wheel 12 surface and does not contact the wheel 12 surface, such predetermined distance being controlled by the overall length of the lateral standoffs 50, thereby eliminating the possibility of over-travel or interaction with the wheel 12 surface.

Referring now to FIG. 6, the wheel cover 70 of the preferred embodiment includes the features described hereinabove with reference to the wheel cover 40 and further includes a front face 72 having visible decorative features, a rear face 74, and additional support features to locate and retain the wire band retainer 90. The support features of the wheel cover 70 include a plurality of ribs 76, and optionally a second plurality of ribs 77 and/or a plurality of locators 78. The ribs 76, the optional ribs 77 and the optional locators 78 axially protrude from the rear face 74 of the wheel cover 70. The ribs 76 and the optional locators 78 are disposed between the elongated tubular extensions 50 on a peripheral surface of the rear face 74 of the wheel cover 70. The optional ribs 77 are disposed on the radial innermost fingers 52 of the elongated tubular extensions 50. It should be appreciated by one of ordinary skill in the art that alternate configurations, arrangements and/or combinations of the optional ribs 77 and locators 78 may be envisioned, and the above disclosure pertaining thereto should not be considered limiting.

Figure 7:
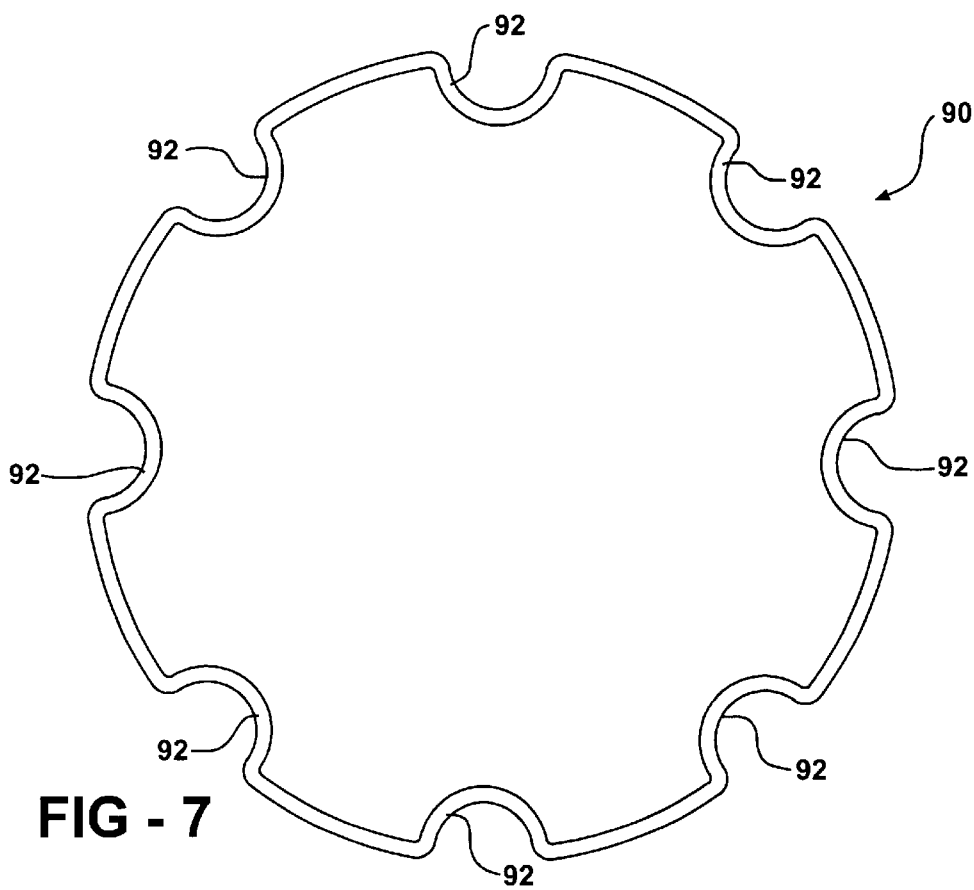
FIG. 7 is a plan view of a wire band retainer.

As best seen in FIGS. 6 and 7, the wire band retainer 90 is preferably composed of a single piece of metal that is formed and welded. The wire band retainer 90 is generally circular and has a plurality of concave sections 92. The ribs 76, the optional ribs 77 and/or the optional locators 78 position the wire band retainer 90 on the inner diameter of the circle having a perimeter defined by the tubular extensions 50 collectively. After establishing location for the wire band retainer 90, the ribs 76 are adapted to engage and thereby axially retain the wire band retainer 90 as described in more detail below. The plurality of concave sections 92 are designed to align with an arc defined by a portion of each tubular extension 50 such that the wire band retainer 90 engages a portion of each tubular extension 50 to bias the corresponding cantilevered tapered fingers 52 and to minimize plastic heat creep.

Figure 8:
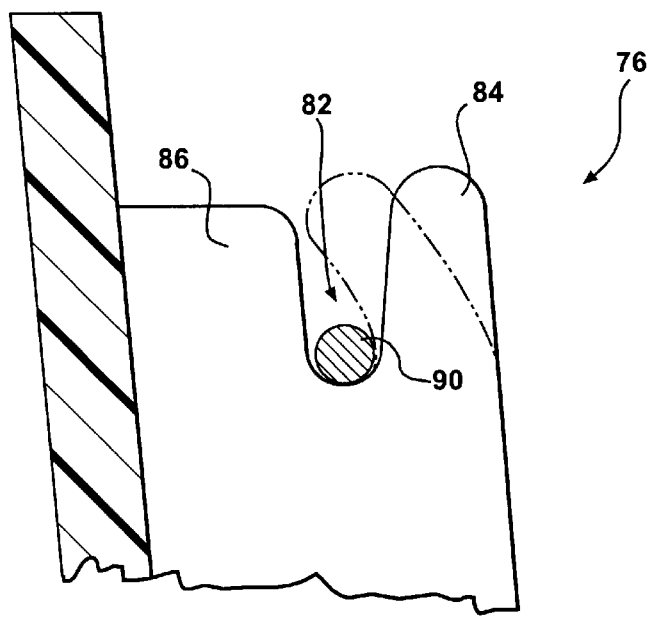
FIG. 8 is an enlarged sectional view of a rib of the wheel cover assembly of FIG. 6.

Referring to FIG. 8, a partial view of one of the ribs 76 is shown in detail. The ribs 76 each include an engagement slot 82, an engagement member 84 and a shoulder 86. The engagement slot 82 is preferably U-shaped and disposed in an innermost axial end of the rib 76 such that the engagement slot 82 defines the engagement member 84 and the shoulder 86. The wire band retainer 90 is assembled to the wheel cover 70 by inserting the wire band retainer 90 into the engagement slot 82 which locates the wire band retainer 90 both radially and axially. After the wire band retainer 90 is disposed within the U-shaped engagement slot 82, the engagement member 84 is plastically deformed in a radially outward direction toward the shoulder 86 to permanently lock the wire band retainer 90 into place. The solid line representation of the engagement member 84 depicts the initial position thereof, while the phantom line representation depicts the deformed position of the engagement member 84 wherein the wire band retainer 90 is locked into place. It should be appreciated by one of ordinary skill in the art that FIG. 8 represents the preferred embodiment, and that there are many other possible configurations for an engagement member adapted to locate and retain the wire band retainer 90.

Figure 9:
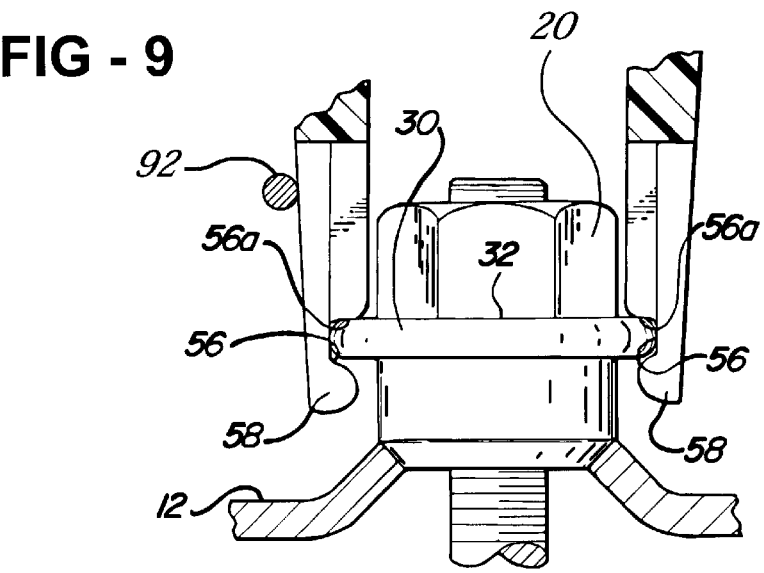
FIG. 9 is an enlarged sectional view of an elongated tubular extension of FIG. 6 and the wire band retainer of FIG. 7 attached to a lug nut.

Referring to FIGS. 6 and 9, a tubular extension 50 of the wheel cover 100 is shown attached to a lug nut 20. The concave sections 92 of the wire band retainer 90 engage only the radial innermost tapered fingers 52 of each tubular extension 50. Therefore, the wheel cover assembly 100 is easily attachable and removable because the wire band retainer 90 engages only the innermost tapered fingers 52, and is designed to flex a predetermined amount while minimizing plastic heat creep. The remaining unsupported fingers 52 also flex sufficiently to attach to and disengage from the lug nuts 20.

The wheel cover assembly 100 advantageously provides two distinct devices, the cantilevered tapered fingers 52 and the wire band retainer 90, acting in conjunction to retain the wheel cover assembly 100 on the lug nuts 20 of the wheel 12 and resulting in a fit that provides significantly improved retention over prior art wheel cover retention systems. Furthermore, many of the shortcomings attributable to conventional plastic retention devices such as poor resistance to heat, relaxation and creep are resolved by the incorporation of the wire band retainer 90.

While the present invention has been described in terms of a preferred embodiment, it is apparent that other forms could be adopted by one skilled in the art. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Those skilled in the art will appreciate that other applications, including those outside of the automotive industry, are possible with this invention. Accordingly, the scope of the present invention is to be limited only by the following claims.

What is claimed is:

1. A wheel cover assembly comprising:
   a plurality of lug nuts each having a flange and a central axis;
   a wheel cover adapted to cover the central portion of a wheel;
   a plurality of elongated tubular extensions extending axially from said wheel cover for attaching the wheel cover to the lug nuts of the wheel, each elongated tubular extension including a plurality of axial slots subdividing the extension into a plurality of cantilevered fingers adapted to engage the flange of a respective lug nut to retain said wheel cover to said wheel;
   means for biasing a portion of at least one of said plurality of cantilevered fingers into engagement with at least one of said lug nuts, said means for biasing configured to radially bias said portion of said at least one of said plurality of cantilevered fingers in a direction towards said central axis of said lug nut; and
   means for locating said biasing means on said wheel cover, said means for locating extending from said wheel cover and disposed between said plurality of elongated tubular extensions;
   whereby said at least one of said plurality of cantilevered fingers assisted by said biasing means snaps into engagement with a respective one of said lug nuts to maintain engagement with said lug nut such that said wheel cover assembly is removably attached to said wheel.

2. The wheel cover assembly of claim 1, wherein said plurality of cantilevered fingers each terminate with a bulbous end portion for engaging said lug nuts and for flexing said cantilevered fingers radially outward as said wheel cover moves axially towards said wheel, said plurality of cantilevered fingers further having an undercut groove adapted to accommodate said flange of said lug nuts thereby preventing disengaging of the fingers from the lug nut.

3. The wheel cover assembly of claim 2, wherein the thickness of each said cantilevered finger decreases as said cantilevered finger extends axially from said wheel cover.

4. The wheel cover assembly of claim 3, wherein said undercut groove of said plurality of cantilevered fingers has an upper shoulder adapted to engage said flange of said lug nuts thereby providing a positive axial location of said wheel cover to said wheel.

5. The wheel cover assembly of claim 1, wherein said means for biasing comprises a wire band retainer composed of a single piece of metal wire that is formed and welded, said wire band retainer being generally circular with a plurality of concave sections each said concave section adapted to align with a respective one of said plurality of elongated tubular extensions.

6. The wheel cover assembly of claim 5, wherein said means for locating includes a plurality of ribs extending from a rear face of said wheel cover and means for engaging said wire band retainer attached to each of said plurality of ribs extending from said rear face of said wheel cover.

7. The wheel cover assembly of claim 6, wherein said wheel cover, said plurality of tubular extensions and said plurality of ribs are composed of injection molded plastic integrally formed in a single mold.

8. The wheel cover assembly of claim 1, wherein said wheel cover assembly covers said lug nuts and the central portion of said wheel.

9. In a vehicle having a wheel mounted thereon by a number of lug nuts, a wheel cover assembly comprising:
   said lug nuts each having a flange and a central axis;
   a wheel cover having a decorative front face for covering said lug nuts and the central portion of said wheel, said wheel cover further having a plurality of elongated tubular extensions for attaching said wheel cover to said lug nuts, each elongated tubular extension having a plurality of slots extending axially from said wheel cover, said slots defining a plurality of cantilevered fingers adapted for engaging said flange of a respective lug nut to retain the wheel cover to the wheel;
   a one-piece wire band retainer disposed within said wheel cover, said wire band retainer having a plurality of concave sections, each concave section aligned with a portion of a respective one of each of said elongated tubular extensions, said wire band retainer being configured to radially support some of said cantilevered fingers and to bias a portion of at least one of said plurality of cantilevered fingers into engagement with at least one of said lug nuts; and
   means for locating said wire band retainer, said means for locating extending from a rear face of said wheel cover and disposed between said plurality of elongated tubular extensions;
   whereby said wheel cover is snap-fit attached to said wheel by axially forcing the cover toward the wheel as the cantilevered fingers flex radially outward as they pass over the flange of the respective lug nuts and said one piece wire band retainer maintains a bias in a direction towards said central axis of said lug nut on said portion of said at least one of said plurality of cantilevered fingers such that said wheel cover is removable from said wheel without removal of the lug nuts.

10. The wheel cover assembly of claim 9, wherein said plurality of cantilevered fingers each terminate with a bulbous end portion for engaging said lug nuts and for flexing said cantilevered fingers radially outward as said wheel cover moves axially towards said wheel, said plurality of cantilevered fingers further having an undercut groove adapted to accommodate said flange of said lug nuts thereby preventing disengaging of the fingers from the lug nut.

11. The wheel cover assembly of claim 10, wherein the thickness of each said cantilevered finger decreases as said cantilevered finger extends axially from said wheel cover.

12. The wheel cover assembly of claim 11, wherein said undercut groove of said plurality of cantilevered fingers has an upper shoulder adapted to engage said flange of said lug nuts thereby providing a positive axial location of said wheel cover to said wheel, and prevent over-installation of said wheel cover.

13. The wheel cover assembly of claim 9, wherein said one-piece wire band retainer is composed of a single piece of metal that is formed and welded.

14. The wheel cover assembly of claim 13, wherein said means for locating includes a plurality of ribs extending from a rear face of said wheel cover and means for engaging said wire band retainer attached to each of said plurality of ribs extending from said rear face of said wheel cover.

15. The wheel cover assembly of claim 14, wherein said wheel cover and said plurality of ribs are composed of injection molded plastic integrally formed in a single mold.

16. In a vehicle having a wheel mounted thereon by a number of lug nuts, a wheel cover retention system comprising:

said lug nuts each having a flange and a central axis;

a wheel cover having a decorative front face covering said lug nuts and the central portion of said wheel, said wheel cover further having a plurality of elongated tubular extensions for attaching the wheel cover to the lug nuts of said wheel, each said elongated tubular extension having a plurality of slots extending axially from said wheel cover, said plurality of slots defining a plurality of cantilevered fingers adapted for engaging said flange of a respective lug nut to retain said wheel cover to said wheel, each said cantilevered finger having an bulbous portion for engaging said lug nut and for flexing said finger radially outward as said wheel cover moves axially towards said wheel, each said bulbous portion having an upper shoulder for engaging said flange of said lug nut thereby providing a positive axial location of said wheel cover to said wheel;

a plurality of integral ribs extending axially from a rear face of said wheel cover, said plurality of ribs being disposed between said plurality of elongated tubular extensions; and a one-piece wire band retainer located by said plurality of ribs, said one-piece wire band retainer having a plurality of concave sections, each concave section aligned with a portion of a respective one of each of said elongated tubular extensions, said wire band retainer being configured to minimize inward radial movement of some of said cantilevered fingers due to heat creep;

whereby said wheel cover is snap-fit attached to said wheel by axially forcing the cover toward the wheel as the cantilevered fingers flex radially outward as they pass over the flange of the respective lug nuts and said one-piece wire band retainer maintaining a bias in a direction towards said central axis of said lug nut such that said wheel cover is removable from said wheel without removal of the lug nuts.

17. The wheel cover assembly of claim 16, wherein said wire band retainer is composed of a single piece of metal wire that is formed and welded.

18. The wheel cover assembly of claim 16, wherein said wheel cover and said plurality of integral ribs are composed of injection molded plastic integrally formed in a single mold.

\* \* \* \* \*

UNITED STATES PATENT AND TRADEMARK OFFICE
CERTIFICATE OF CORRECTION

PATENT NO. : 6,682,151 B1
DATED : January 27, 2004
INVENTOR(S) : Garry Van Houten and Lawrence E. O'Toole It is certified that error appears in the above-identified patent and that said Letters Patent is hereby corrected as shown below:

Column 4,
Line 56, delete "respective", and insert -- perspective --.

Column 5,
Line 64, after "undercut", insert -- groove --.

Column 8,
Line 18, after "of concave sections" insert a comma -- , --.
Line 23, after "and", insert -- further comprising --.
Line 50, delete "some of" and insert -- at least one of --.

Signed and Sealed this

Sixth Day of July, 2004

JON W. DUDAS
*Acting Director of the United States Patent and Trademark Office*